(12) United States Patent
Tessien

(10) Patent No.: US 8,157,433 B2
(45) Date of Patent: *Apr. 17, 2012

(54) MAGNETIC FLUID ROTATION SYSTEM FOR A CAVITATION CHAMBER

(75) Inventor: Ross Alan Tessien, Grass Valley, CA (US)

(73) Assignee: Impulse Devices Inc., Grass Valley, CA (US)

( * ) Notice: Subject to any disclaimer, the term of this patent is extended or adjusted under 35 U.S.C. 154(b) by 519 days.

This patent is subject to a terminal disclaimer.

(21) Appl. No.: 11/057,347

(22) Filed: Feb. 14, 2005

(65) Prior Publication Data

US 2006/0159557 A1 Jul. 20, 2006

Related U.S. Application Data

(63) Continuation-in-part of application No. 11/038,344, filed on Jan. 18, 2005, now Pat. No. 7,677,790.

(51) Int. Cl.
*B01F 11/00* (2006.01)

(52) U.S. Cl. .................... 366/108; 366/114; 366/273

(58) Field of Classification Search .................. 366/108, 366/114, 115, 124, 127, 273, 274, 293; 95/30, 95/241, 260, 261, 266

See application file for complete search history.

(56) References Cited

U.S. PATENT DOCUMENTS 2,376,221 A * 5/1945 Baker ................................ 95/30
2,982,524 A * 5/1961 Bland ............................ 366/118
3,007,454 A * 11/1961 Joelson ........................... 91/321
3,051,457 A * 8/1962 Rice ............................... 366/293
3,614,069 A * 10/1971 Murry ............................ 366/119
3,676,983 A * 7/1972 Nold ............................... 96/196

(Continued)

FOREIGN PATENT DOCUMENTS

WO PCT/US95/15972 7/1996

(Continued)

OTHER PUBLICATIONS

Blake et al, Acoustic Cavitation:The Fluid Dynamics of Non-Spherical Bubbles, Phil. Trans. R. Soc. Lond. A, 1999, pp. 251-267, vol. 357, Publisher: The Royal Society, Published in: Great Britain.

(Continued)

*Primary Examiner* — David Sorkin
(74) *Attorney, Agent, or Firm* — Intrinsic Law Corp

(57) ABSTRACT

A system for achieving bubble stability within a cavitation chamber is provided. The system includes an impeller assembly, the impeller assembly having at least one impeller blade located within the cavitation chamber. The impeller assembly is magnetically coupled to an external drive system which is used to rotate the impeller, thereby causing bubbles within the cavitation chamber to move toward the impeller's axis of rotation. As a consequence, the bubbles become more stable. Preferably the axis of rotation of the impeller is positioned in a substantially horizontal plane, thus allowing the rotating impeller to counteract the tendency of the bubbles to drift upward and to accumulate on the upper, inner surfaces of the cavitation chamber. The impeller can be rotated continuously throughout the cavitation process or stopped prior to, or during, bubble cavitation. In the latter scenario, the impeller can be stopped, and if desired locked, at a specific rotational position, thus minimizing possible interference between the impeller and the source of the cavitation energy. The impeller can be shaped to correspond to the inner surface of the cavitation chamber, for example spherically or cylindrically, and can utilize multiple impeller blades.

5 Claims, 11 Drawing Sheets

U.S. PATENT DOCUMENTS

| | | | |
|---|---|---|---|
| 3,744,763 A * | 7/1973 | Schnoring et al. | 366/178.1 |
| 4,333,796 A | 6/1982 | Flynn | |
| 4,563,341 A | 1/1986 | Flynn | |
| 5,176,446 A * | 1/1993 | Chiba et al. | 366/114 |
| 5,659,173 A | 8/1997 | Putterman et al. | |
| 5,858,104 A | 1/1999 | Clark | |
| 6,095,677 A * | 8/2000 | Karkos et al. | 366/274 |
| 6,386,751 B1 * | 5/2002 | Wootan et al. | 366/170.3 |
| 6,627,784 B2 * | 9/2003 | Hudson et al. | 588/320 |
| 2002/0090047 A1 | 7/2002 | Stringham | |
| 2003/0044442 A1 * | 3/2003 | Stanier et al. | 424/401 |
| 2004/0191707 A1 * | 9/2004 | Mitsui et al. | 430/567 |

FOREIGN PATENT DOCUMENTS

| | | | |
|---|---|---|---|
| WO | WO 01/39199 | * | 5/2001 |
| WO | PCT/CA03/00342 | | 9/2003 |

OTHER PUBLICATIONS

M. Dan et al., Ambient Pressure Effect on Single-Bubble Sonoluminescence, Physical Review Letters, Aug. 30, 1999, pp. 1870-1873, vol. 83, No. 9, Publisher: The American Physical Society, Published in: US.

Moss et al., Computed Optical Emissions from a Sonoluminescing Bubble, Physical Review E, Mar. 1999, pp. 2986-2992, vol. 59, No. 3, Published in: US.

Gaitan et al, Experimental Observations of Bubble Response and Light Intensity Near the Threshold for Single Bubble Sonoluminescence, Physical Review E, May 1999, pp. 5495-5502, vol. 59, No. 5, Published in: US.

Barber et al, Sensitivity of Sonoluminescence to Experimental Parameters, Physical Review Letters, Feb. 28, 1994, pp. 1380-1382, vol. 72, No. 9.

Putterman, Sonoluminescence:Sound Into Light, Scientific American, Feb. 1995, pp. 46-51.

Gaitan et al., Sonoluminescence and Bubble Dynamics for a Single, Stable, Cavitation Bubble, J. Acoust. Soc. Am., Jun. 1992, pp. 3166-3183, vol. 91, No. 6, Publisher: Acoustical Society of America.

Crum, Sonoluminescence, Physics Today, Sep. 1994, pp. 22-29, Publisher: American Institute of Physics, Published in: US.

A. Chakravarty et al., Stable Sonoluminescence Within a Water Hammer Tube, Physical Review E, Jun. 24, 2004, pp. 1-8, vol. 69, No. 066317, Publisher: The American Physical Society, Published in: US.

Bollinger, Ultra Cavitation, http://wiretap.area.com/Gopher/Library/Article/Sci/cavitate.ult, Sep. 17, 2001, pp. 1-26.

* cited by examiner

MAGNETIC FLUID ROTATION SYSTEM FOR A CAVITATION CHAMBER

CROSS-REFERENCES TO RELATED APPLICATIONS

This application is a continuation-in-part of U.S. patent application Ser. No. 11/038,344, filed Jan. 18, 2005 now U.S. Pat. No. 7,677,790, the disclosure of which is incorporated herein by reference for any and all purposes.

FIELD OF THE INVENTION

The present invention relates generally to cavitation systems and, more particularly, to a magnetic system for stabilizing bubbles within a cavitation chamber via fluid rotation.

BACKGROUND OF THE INVENTION

Sonoluminescence is a well-known phenomena discovered in the 1930's in which light is generated when a liquid is cavitated. Although a variety of techniques for cavitating the liquid are known (e.g., spark discharge, laser pulse, flowing the liquid through a Venturi tube), one of the most common techniques is through the application of high intensity sound waves.

In essence, the cavitation process consists of three stages; bubble formation, growth and subsequent collapse. The bubble or bubbles cavitated during this process absorb the applied energy, for example sound energy, and then release the energy in the form of light emission during an extremely brief period of time. The intensity of the generated light depends on a variety of factors including the physical properties of the liquid (e.g., density, surface tension, vapor pressure, chemical structure, temperature, hydrostatic pressure, etc.) and the applied energy (e.g., sound wave amplitude, sound wave frequency, etc.).

Although it is generally recognized that during the collapse of a cavitating bubble extremely high temperature plasmas are developed, leading to the observed sonoluminescence effect, many aspects of the phenomena have not yet been characterized. As such, the phenomena is at the heart of a considerable amount of research as scientists attempt to further characterize the phenomena (e.g., effects of pressure on the cavitating medium) as well as its many applications (e.g., sonochemistry, chemical detoxification, ultrasonic cleaning, etc.). By-products of this research have been several patents claiming various aspects of the process. One such patent, U.S. Pat. No. 4,333,796, discloses a cavitation chamber that is generally cylindrical although the inventors note that other shapes, such as spherical, can also be used. It is further disclosed that the chamber is comprised of a refractory metal such as tungsten, titanium, molybdenum, rhenium or some alloy thereof. U.S. Pat. No. 4,333,796 states that the temperatures achieved by a collapsing bubble depend strongly on whether or not the interface of the bubble and the host liquid remain spherical during collapse. Noting that the earth's gravitational field is an asymmetric force that can cause bubble deformation, the patent discloses that a preferred cavitation chamber includes means for applying a magnetic field to cancel the gravitational force, thus creating a zero-gravity field within the cavitation zone. U.S. Pat. No. 4,333,796 further discloses that if the bubble is cylindrical or quasi-cylindrical, small surface perturbations will neither grow nor decay. The patent discloses several means of achieving such a bubble shape, including imposing a time-varying magnetic field. U.S. Pat. No. 4,563,341, a continuation-in-part of U.S. Pat. No. 4,333,796, discloses the use of a vertical standing pressure wave excited by a transducer in the bottom wall of the chamber as a means of reducing the effects of the earth's gravitational field within the cavitation zone.

U.S. Pat. No. 5,659,173 discloses a sonoluminescence system that uses a transparent spherical flask. The spherical flask is not described in detail, although the specification discloses that flasks of Pyrex®, Kontes®, and glass were used with sizes ranging from 10 milliliters to 5 liters. U.S. Pat. No. 5,659,173 does not disclose any means for stabilizing bubbles within the cavitation zone.

U.S. Pat. No. 5,858,104 discloses a shock wave chamber partially filled with a liquid. The remaining portion of the chamber is filled with gas which can be pressurized by a connected pressure source. Acoustic transducers mounted in the sidewalls of the chamber are used to position an object within the chamber. Another transducer mounted in the chamber wall delivers a compressional acoustic shock wave into the liquid. A flexible membrane separating the liquid from the gas reflects the compressional shock wave as a dilatation wave focused on the location of the object about which a bubble is formed.

PCT WO 03/077260 discloses a nuclear fusion reactor in which a bubble of fusionable material is compressed using an acoustic pulse, the compression of the bubble providing the necessary energy to induce nuclear fusion. The nuclear fusion reactor is spherically shaped and filled with a liquid such as molten lithium or molten sodium. To form the desired acoustic pulse, a pneumatic-mechanical system is used in which a plurality of pistons associated with a plurality of air guns strike the outer surface of the reactor with sufficient force to form a shock wave within the reactor's liquid. The application discloses releasing the bubble at the bottom of the chamber and applying the acoustic pulse as the bubble passes through the center of the reactor. A number of methods of determining when the bubble is approximately located at the center of the reactor are disclosed. The application also discloses that a bubble positioning system may be used, the system comprised of two pairs of jets which flow the liquid within the reactor inwardly, thereby directing the bubble towards the center of the vessel.

PCT WO 96/21230 discloses a non-periodically forced bubble fusion apparatus. The apparatus is comprised of a liquid-filled pressure vessel into which deuterium gas bubbles are injected. A non-periodic pressure field is generated within the liquid, the pressure field causing the bubbles to oscillate and become compressed thereby heating the bubbles to a temperature which is sufficiently high to cause a fusion reaction in the hot deuterium plasma formed at implosion stagnation. The application does not disclose any means of stabilizing the movement of the injected bubbles or positioning the bubbles within the pressure vessel.

In a paper entitled *Sonoluminescence and Bubble Dynamics for a Single, Stable, Cavitation Bubble* (J. Acoust. Soc. Am. 91 (6), June 1992), Felipe Gaitan et al. modeled the motion of acoustically driven bubbles based on the results of their single bubble experiments. The authors' experimental apparatus included a liquid filled levitation cell in which a stationary acoustic wave was excited, the stationary wave counteracting the hydrostatic or buoyancy force, thus stabilizing a bubble injected into the cell and allowing it to remain suspended in the liquid indefinitely.

Avik Chakravarty et al., in a paper entitled *Stable Sonoluminescence Within a Water Hammer Tube* (Phys Rev E 69 (066317), Jun. 24, 2004), investigated the sonoluminescence effect using a water hammer tube rather than an acoustic resonator, thus allowing bubbles of greater size to be studied.

The experimental apparatus employed by the authors included a sealed water hammer tube partially filled with the liquid under investigation. The water hammer tube was mounted vertically to the shaft of a moving coil vibrator. Cavitation was monitored both with a microphone and a photomultiplier tube. To stabilize the bubbles within the water hammer tube and minimize the effects of the tube walls, in one embodiment the tube was rotated about its axis.

Although a variety of sonoluminescence systems have been designed, typically these systems suffer from a variety of shortcomings due to the inherent instability of the cavitating bubbles. The present invention overcomes these shortcomings by providing a system for stabilizing the cavitating bubbles within the cavitation chamber.

SUMMARY OF THE INVENTION

The present invention provides a system for achieving bubble stability within a cavitation chamber. The system includes an impeller assembly, the impeller assembly having at least one impeller blade located within the cavitation chamber. The impeller assembly is magnetically coupled to an external drive system which is used to rotate the impeller, thereby causing bubbles within the cavitation chamber to move toward the impeller's axis of rotation. As a consequence, the bubbles become more stable. Preferably the axis of rotation of the impeller is positioned in a substantially horizontal plane, thus allowing the rotating impeller to counteract the tendency of the bubbles to drift upward and to accumulate on the upper, inner surfaces of the cavitation chamber. Associated with the cavitation chamber is at least one cavitation driver. If desired, a cavitation fluid circulatory system can be coupled to the cavitation chamber.

In at least one embodiment of the invention the impeller is rotated continuously throughout the cavitation process. Alternately, impeller rotation can be stopped prior to, or during, bubble cavitation. In this instance the impeller can be stopped, and if desired locked, at a specific rotational position, thus minimizing possible interference between the impeller and the source of the cavitation energy.

In at least one embodiment of the invention, both the cavitation chamber and the impeller are cylindrically shaped. In an alternate embodiment, both the cavitation chamber and the impeller are spherically shaped.

In at least one embodiment of the invention, the impeller assembly is comprised of a two-bladed impeller. Alternate embodiments use impellers with different numbers of blades. The primary constraint placed on impeller configuration is to minimize turbulence which may result as the impeller blade(s) moves through the cavitation fluid.

A further understanding of the nature and advantages of the present invention may be realized by reference to the remaining portions of the specification and the drawings.

DESCRIPTION OF THE SPECIFIC EMBODIMENTS

Figure 1:
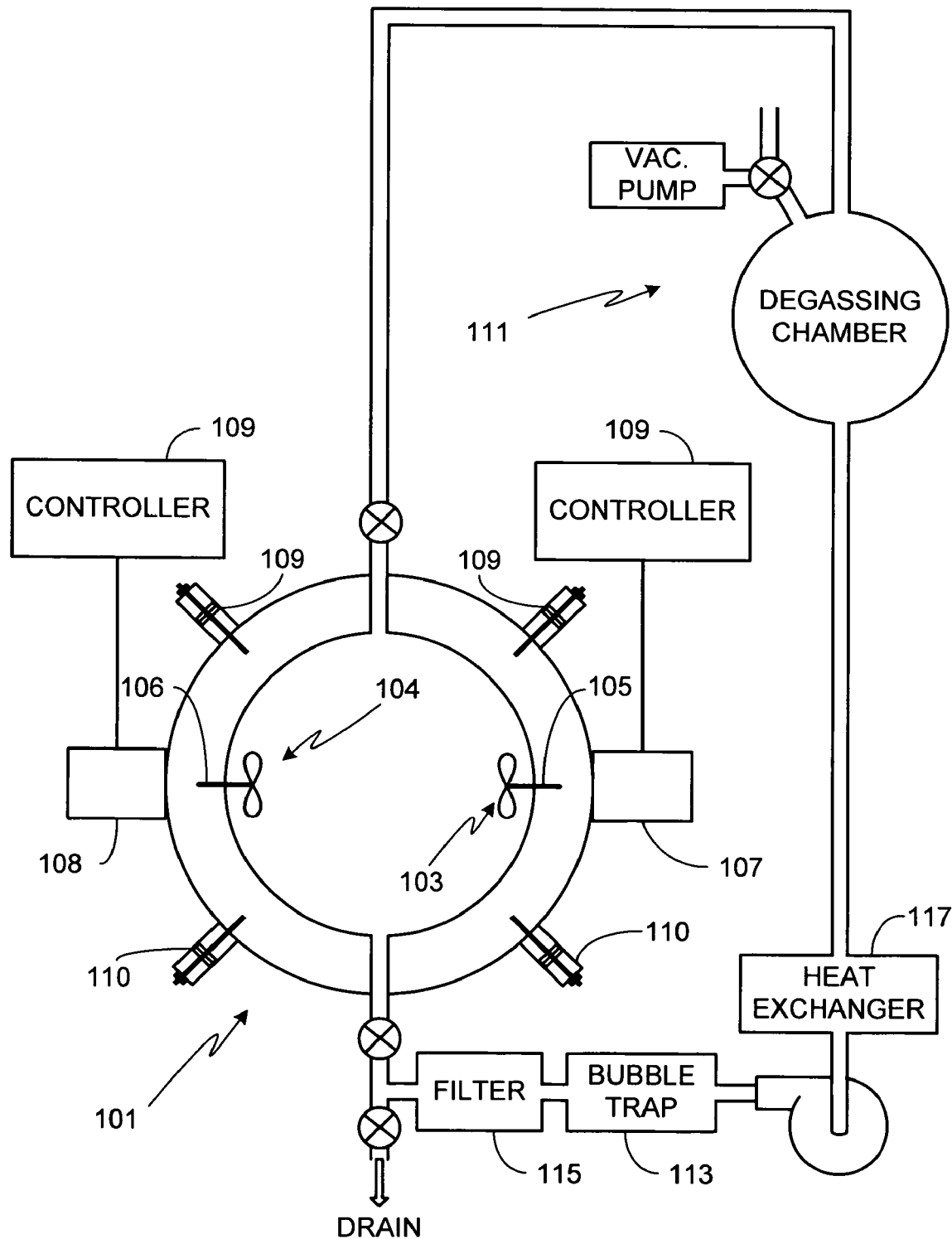
FIG. 1 is a conceptual illustration of the principal elements of the invention implemented in an exemplary embodiment.

FIG. 1 is a conceptual illustration of the principal elements of the invention implemented in an exemplary embodiment. The invention is fitted to a sonoluminescence cavitation chamber 101, hereafter referred to as simply a cavitation chamber, and uses at least one impeller 103, and in at least one embodiment a pair of impellers 103/104, to stabilize and axially center bubbles within the cavitation chamber. If a pair of impellers is used, preferably the axes of the two impellers are coaxial as shown. Impellers 103/104 are coupled to drive shafts 105/106, respectively, the drive shafts not extending through the outer wall of chamber 101. By containing the entire impeller assemblies within the outer wall of the chamber, it is much easier to seal the chamber since a major source of leaks, i.e., the drive shaft seals, is eliminated. As a result, it is less difficult to operate the chamber at higher pressures.

Impellers 103/104, and more specifically impeller drive shafts 105/106, are magnetically coupled to drive motors 107/108. Each motor, assuming that the system utilizes a pair of motors/impellers, is coupled to a controller 109. It will be appreciated that in the description that follows unless a specific embodiment is being discussed with a particular impeller arrangement, the general description refers to both single impeller and multiple impeller embodiments.

Impeller 103, alternately impellers 103/104, serve many purposes. First, the impeller(s) helps to keep cavitating bubbles, regardless of their size, away from the inner chamber surfaces, thus insuring that the imploding bubbles are completely surrounded by liquid. As a result, the implosion symmetry and peak stagnation temperature and pressure of the imploding bubbles are improved. Second, the impeller(s)

centers the bubble or bubbles along the impeller's axis. Therefore if the impeller axis is maintained in a horizontal plane, as preferred, the impeller's rotation can be used to overcome the bubble's tendency to drift upward through the chamber. This benefit is especially important if larger bubbles are used in the cavitation process. Third, by locating the bubbles in a known position through the use of the impeller(s), the means used to drive energy into the cavitation chamber can be designed to more efficiently couple the driving energy into the cavitating bubble. Fourth, the impeller(s) can be used to improve the sphericity of the bubbles during the cavitation process, in particular during the period of cavitation in which the bubbles are collapsing. As a result, smaller bubble diameters can be achieved prior to bubble deformation or disintegration.

It will be appreciated that the present invention, i.e., a means of rotating the cavitation fluid within a cavitation chamber, is not limited to a particular outside chamber diameter, inside chamber diameter, chamber material, cavitation fluid or chamber shape (e.g., cylindrical chambers, spherical chambers, rectangular chambers, etc.). Such information, as provided herein, is only meant to provide exemplary chamber configurations for which the present invention is applicable. Similarly, the invention is not limited to the acoustic drivers 110 shown in FIG. 1, rather the invention can be used with any of a variety of cavitation driver types, numbers or mounting locations. Similarly, the invention is not limited to a specific system configuration, i.e., the invention can be used with a sealed chamber or a chamber in which the cavitation fluid passes through a circulatory system as shown in FIG. 1. If a circulatory system is used, it may or may not include a degassing system 111, and/or a bubble trap 113, and/or a filter 115 and/or a heat exchange system 117. If a circulatory system is used, the chamber inlet and outlet locations as well as the selected cavitation fluid flow rate are preferably designed to minimize disruption of cavitation fluid rotation. Typically the cavitation fluid is degassed (e.g., of air) prior to initiating cavitation, and typically before initiating impeller rotation.

Figure 2:
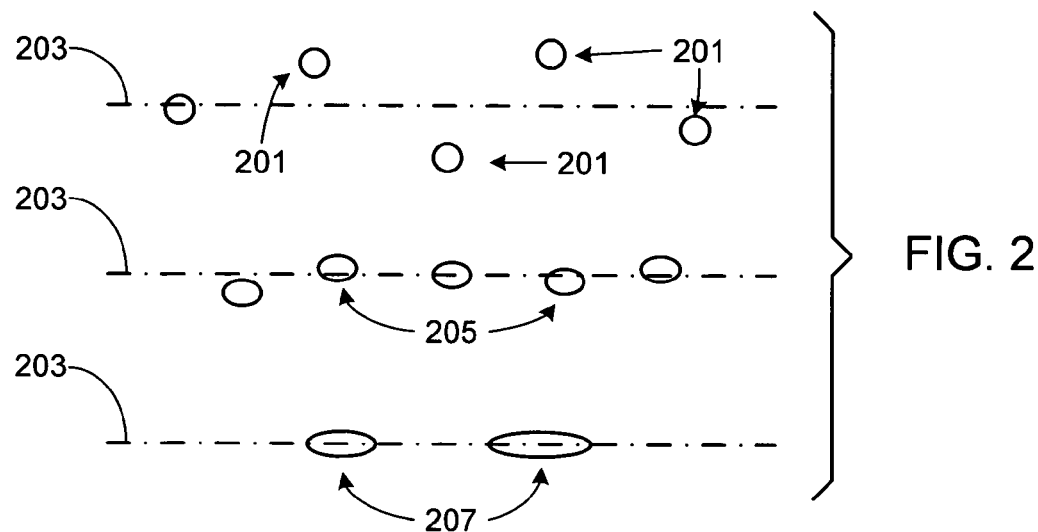
FIG. 2 illustrates the effects of cavitation fluid rotation on a plurality of bubbles contained within a cavitation chamber.

FIG. 2 illustrates some of the primary shapes associated with bubble rotation. Initially, immediately after the impeller(s) starts to rotate and assuming a relatively low impeller rotation velocity, bubbles 201 are drawn toward the rotational axis 203. During this stage of rotation and with low rotation velocities, the bubbles remain quasi-spherical in shape as the force exerted by the rotating fluid is insufficient to overcome the bubbles' tendency to assume a spherical shape, thereby minimizing the bubble's surface tension. As the rotational velocity increases, the bubbles 205 are drawn more forcefully towards the rotational axis 203. Simultaneously, bubbles 205 begin to elongate as illustrated. At this stage typically there is a 'string' of bubbles formed along the rotational axis, the sphericity of each of the bubbles depending strongly on the rotational velocity of the fluid. If the bubbles are sufficiently large, or the rotational velocity sufficiently high, often multiple bubbles will coalesce into larger, elongated bubbles 207, the number and size of bubbles 207 depending upon the number of bubbles, their sizes, and the rotational velocity. Whether the bubbles are vapor filled (evacuated) or gas filled (for example, with gases to be reacted), their behavior is substantially the same. Of course other factors such as fluid pressure, composition, density and surface tension also determine the sphericity of the bubbles for a given rotational velocity.

As previously noted, the degree to which the bubble(s) is centered along the fluid's axis of rotation as well as the degree to which the bubble(s) is elongated depends on the fluid rotation velocity and the length of time that the fluid has been rotated. Additionally impeller rotation can either be continuous or non-continuous. The inventor has found that continuous impeller rotation is best employed when the drivers are comprised of acoustic drivers, and non-continuous impeller rotation is best when it is desirable to place (and if desired, lock) the impeller blades at a specific location prior to initiating cavitation implosions or during a specific period of cavitation. It will be appreciated that other factors, such as the desired bubble shape or location, can also influence whether impeller rotation should be continuous or non-continuous.

Figure 3:
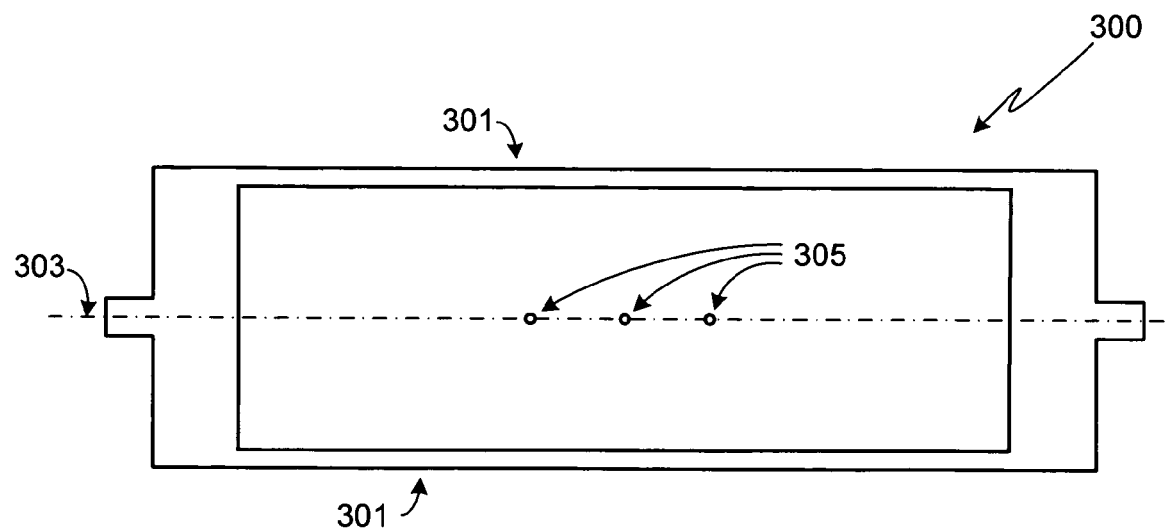
FIG. 3 illustrates a specific bubble geometry with a few small bubbles within a cylindrical impeller.
Figure 4:
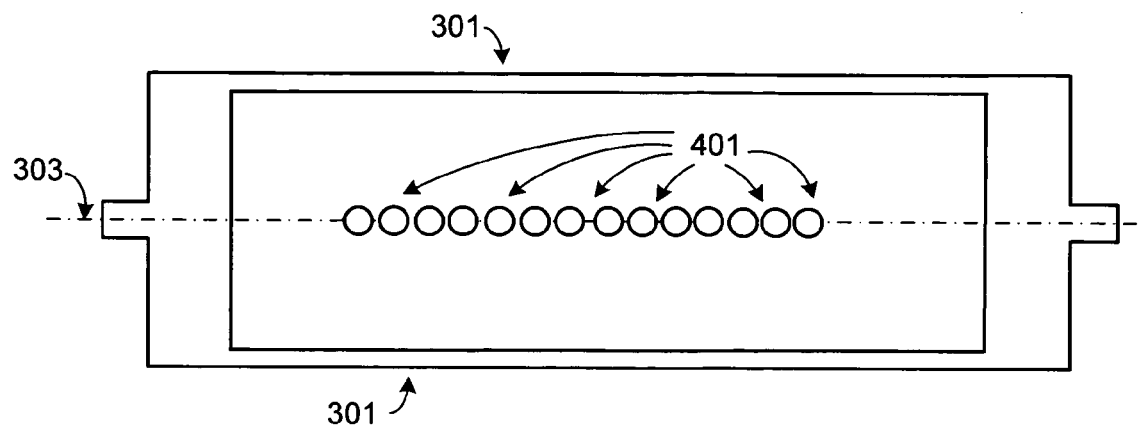
FIG. 4 illustrates a relatively large number of bubbles within a cylindrical cavity prior to bubble collapse.
Figure 5:
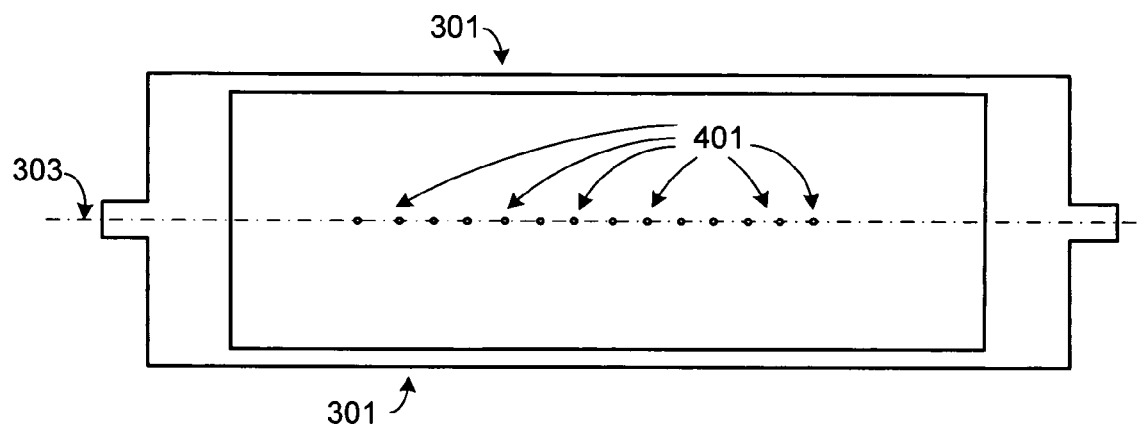
FIG. 5 illustrates the bubbles of FIG. 4 during bubble collapse.
Figure 6:
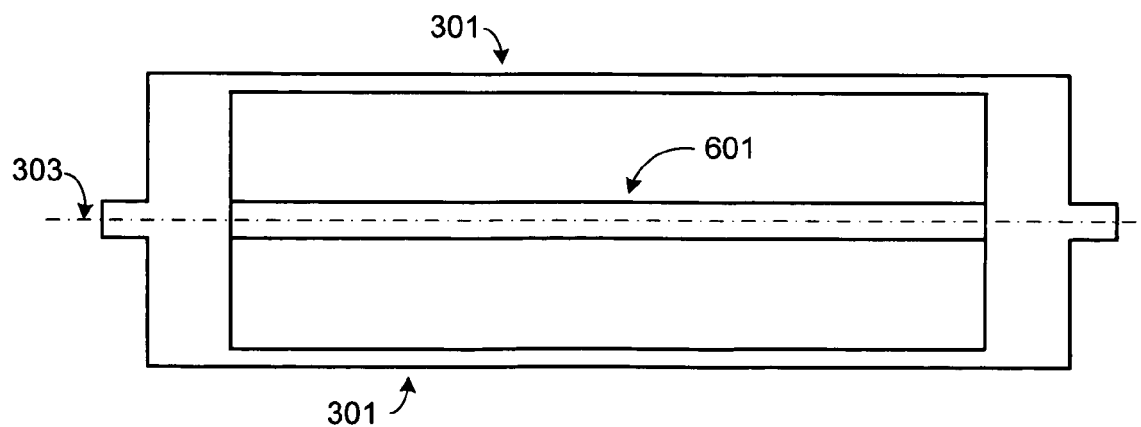
FIG. 6 illustrates one, extremely large cylindrical bubble within a cylindrical cavity prior to bubble collapse.
Figure 7:
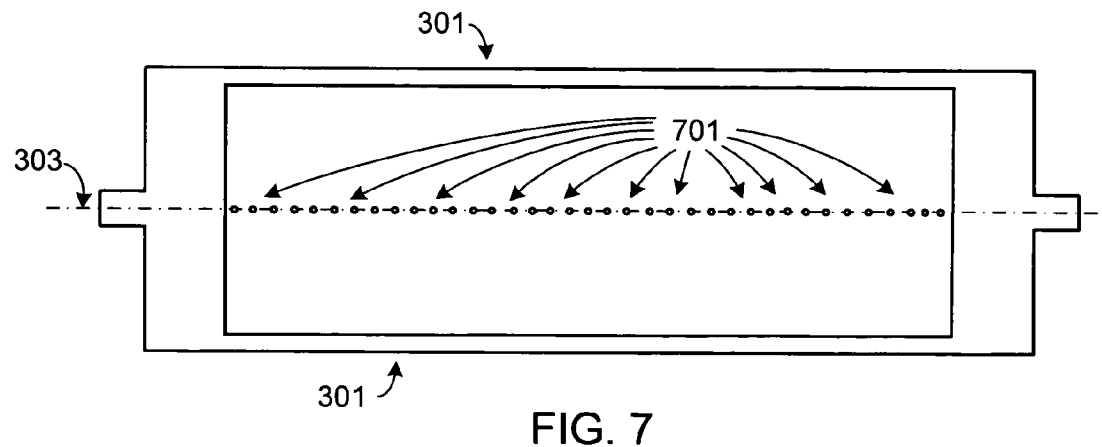
FIG. 7 illustrates the degeneration of the cylindrical bubble of FIG. 6 during bubble collapse.

The inventor has found that depending upon bubble density (i.e., number) and bubble size (i.e., bubble volume), impeller rotation can be used to generate a variety of different bubble geometries. FIGS. 3-7 illustrate three such geometries. For purposes of illustration, these bubble geometries are shown within a cylindrical impeller 300 comprised of a pair of impeller blades 301, the impeller axis of rotation 303 located in a horizontal plane. FIG. 3 illustrates a few (e.g., three) small bubbles 305 held along axis 303. FIGS. 4 and 5 illustrate a large number of relatively large volume bubbles 401 before (i.e., FIG. 4) and during (i.e., FIG. 5) bubble collapse. FIG. 6 illustrates one, extremely large cylindrical bubble 601 prior to collapse. During collapse (i.e., FIG. 7), bubble 601 degenerates into a plurality of small bubbles 701.

As previously noted, a variety of different bubble geometries can be achieved by varying the impeller rotation velocity, selecting either continuous or non-continuous impeller rotation, and controlling the bubble density and bubble volume. Additionally it will be appreciated that other parameters such as impeller design and cavitation fluid composition affect the bubble geometry. With respect to composition, the two primary attributes of the selected cavitation medium which control the response of a bubble to the rotating impeller(s) is the medium's viscosity and surface tension. Increasing the viscosity of the cavitation medium affects the ease by which the impeller(s) can rotate within the fluid as well as the rate at which bubbles can move within the fluid, both during impeller rotation and after cessation of impeller rotation. The surface tension affects the extent of bubble elongation in response to impeller rotation.

Figure 8:
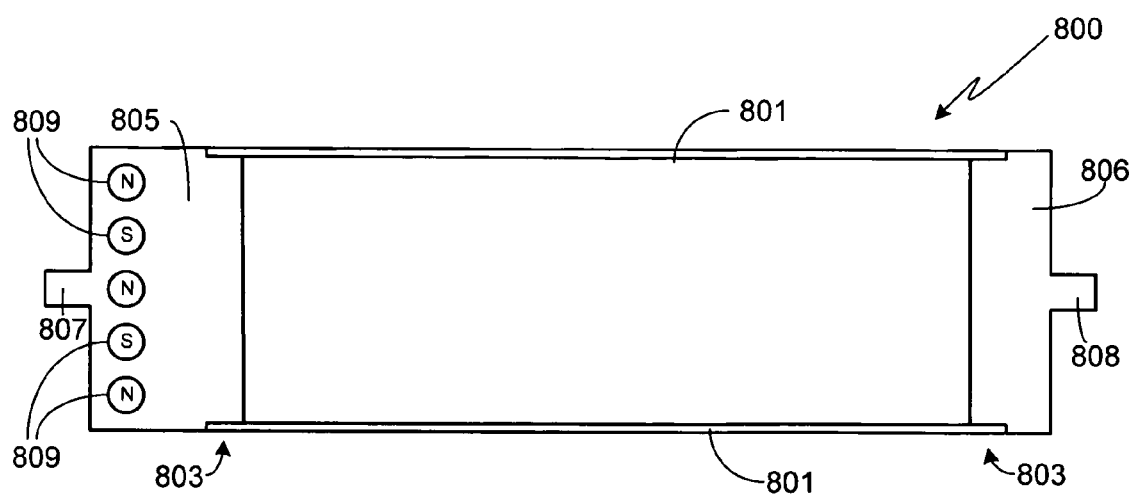
FIG. 8 is a cross-sectional view of a preferred impeller design for use with a cylindrical cavitation chamber.
Figure 9:
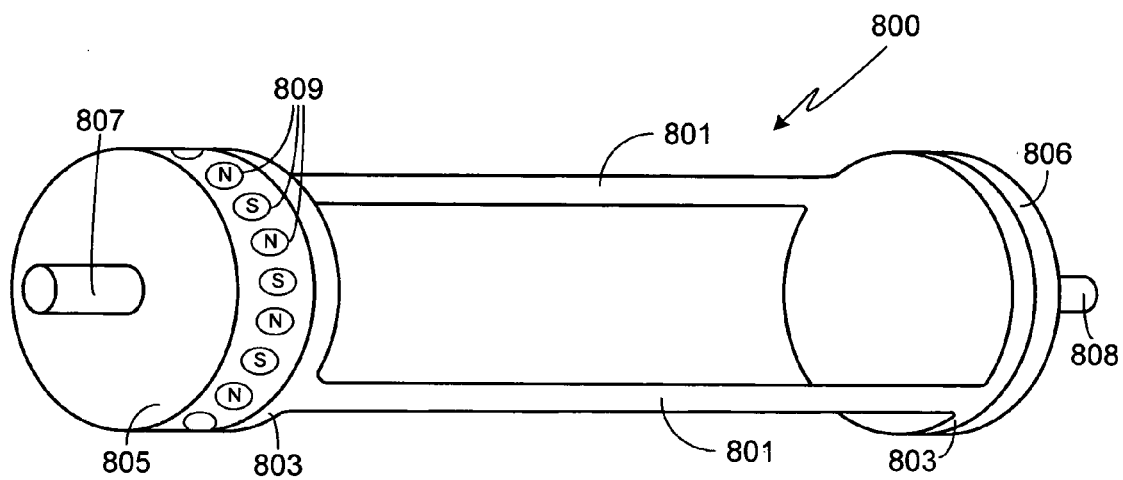
FIG. 9 is a perspective view of the impeller shown in FIG. 8.
Figure 10:
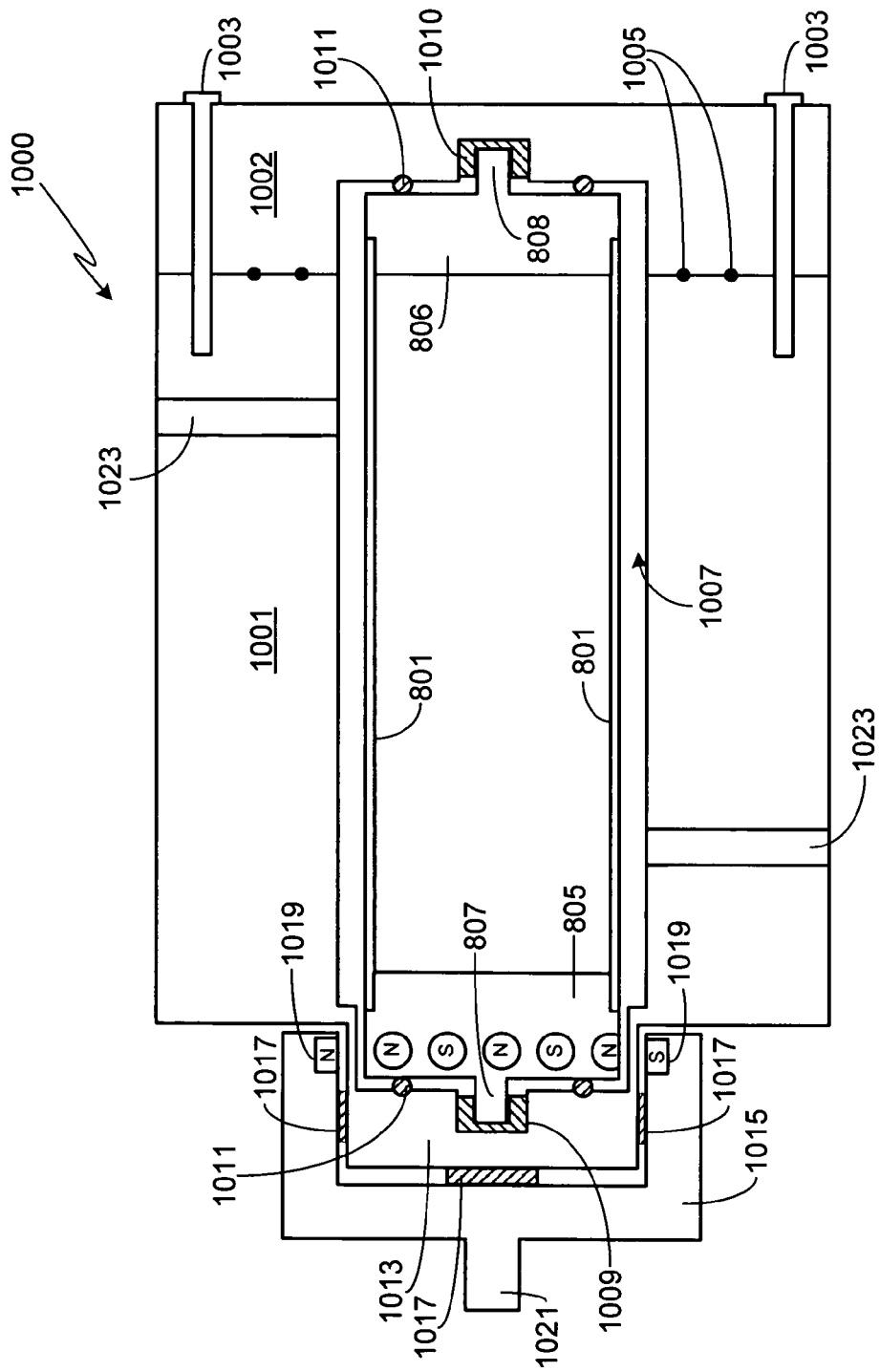
FIG. 10 is a cross-sectional view of a cavitation chamber utilizing the impeller shown in FIGS. 8 and 9.

Although as previously noted the invention is not limited to a specific design for either the impeller(s) or the chamber, a preferred embodiment of the invention for use with a cylindrical chamber is shown in FIGS. 8-10. As shown in the cross-sectional view of FIG. 8 and the perspective view of FIG. 9, impeller 800 has a pair of impeller blades 801. Note that in FIG. 9, impeller 800 has been rotated to provide a clearer view of impeller blades 801. For applications in which stable on-axis bubbles are desired, preferably the outside diameter of impeller 800 is smaller than the inside diameter of the cavitation chamber by a sufficient amount to minimize wall turbulence that can be caused by rotating the impeller blades in near proximity to the cavity wall. For applications in which bubble clouds are desired, preferably impeller 800 utilizes thick impeller blades and the outside diameter of the impeller is only slightly smaller than the inside of the cavitation chamber, thereby maximizing wall and blade created turbulence.

For ease of fabrication, impeller 800 is fabricated from a cylinder. In one exemplary embodiment the cylinder is 6 inches long with an outside diameter of 2.5 inches and a wall thickness of 0.0625 inches. During impeller fabrication, most of the wall of the cylinder is machined away, leaving only blades 801 and a portion 803 of the cylinder at either end. Although the invention does not require that impeller 800 use two blades 801 as shown, the inventor has found that two blades provide sufficient fluid rotation capabilities while also providing a strong mechanical design. Other impeller configurations, however, are clearly envisioned (e.g., three blades, four blades, etc.). The primary requirements placed on the number and locations of the impeller blades for axial bubble stabilization are (i) balanced and stable operation during rotation and (ii) minimization of impeller created turbulence.

Attached to end portions 803 are cylinder end caps 805 and 806. The end caps can be attached using any of a variety of means, including but not limited to press-fitting, bonding, brazing or bolting the pieces together. As shown in further detail below, end caps 805 and 806 include spindles 807 and 808, respectively, the spindles confining the axis of rotation of the impeller along the centerline of the chamber. Embedded within end cap 805 is at least one permanent magnet 809, and preferably a plurality of permanent magnets 809 of alternating magnetic polarity.

FIG. 10 is a cross-sectional view of impeller 800 within a chamber 1000. In the illustrated embodiment, chamber 1000 is comprised of two sections, 1001 and 1002, bolted together with a plurality of bolts 1003. One or more sealing members 1005 (e.g., o-rings) provide the desired seal between sections 1001 and 1002. Sealing members 1005 are designed to insure that cavitation chamber 1000 can be either evacuated, preferably to a pressure of less than the vapor pressure of the cavitation fluid, or pressurized, preferably to a pressure of at least 1,000 PSI, more preferably to a pressure of at least 10,000 PSI, and still more preferably to a pressure of at least 100,000 PSI. Thus the sealing members are designed to allow the chamber to be either evacuated for degassing or pressurized during operation. It will be appreciated that the invention is not limited to a particular seal arrangement and that there are numerous means for adequately sealing chamber 1000.

A cylindrical hole 1007 is bored into sections 1001 and 1002 such that impeller 800 fits within the hole as shown in the chamber cross-sectional view of FIG. 10. Assuming an impeller with an outside diameter of 2.5 inches, in one preferred embodiment the inside diameter of the cavitation cavity (i.e., hole 1007) is 3.0 inches. Spindles 807 and 808, and thus impeller 800, are centered within hole 1007 using bearings 1009 and 1010, respectively. In addition to centering impeller 800, bearings 1009 and 1010 insure the free rotation of the impeller. In one embodiment, bearings 1009 and 1010 are fabricated from a material with a low coefficient of friction, such as Teflon. To insure that end caps 805 and 806 of impeller 800 do not rub against sections 1001 and 1002 of chamber 1000, preferably one or more spacers 1011 are interposed between the end caps and the chamber internal surfaces as shown. In one embodiment, spacers 1011 are comprised of Teflon o-rings. It will be appreciated that although bearings 1009/1010 and spacers 1011 are preferably comprised of Teflon, alternate materials may be required depending upon the composition, temperature and corrosive characteristics of the cavitation medium.

In the illustrated embodiment, the outer surface of end portion 1013 of chamber section 1001 is cylindrically shaped. A cup-shaped member 1015 is configured to rotate about end portion 1013. Optionally one or more spacers 1017, for example Teflon spacers, are used to insure the smooth rotation of member 1015. Embedded within an internal surface of member 1015 adjacent to the external surface of end cap 805 is a plurality of permanent magnets 1019 of alternating magnetic polarity. A drive shaft 1021 of member 1015 is coupled to a drive motor (not shown). Due to the magnetic field generated by magnets 1019 and its interaction with the magnetic field generated by magnets 809, rotation of member 1015 causes the rotation of impeller 800 within chamber 1000. Similarly, impeller 800 can be positioned within chamber 1000 by controlling the rotational position of member 1015.

Preferably chamber 1000 also includes a pair of chamber inlets 1023, thus allowing the chamber to be filled, drained and/or coupled to a cavitation fluid circulatory system as described in detail in co-pending application Ser. No. 11/001,720, the disclosure of which is incorporated herein for any and all purposes. The chamber inlets 1023 are preferably located at the top and bottom portions, respectively, of chamber 1000, and more preferably located at the uppermost and lowermost portions of chamber 1000, thereby preventing bubbles from being trapped within the chamber.

With respect to the material used for chamber 1000 (i.e., sections 1001 and 1002), the selected material must meet several criteria. First, the material is preferably machinable, thus simplifying chamber fabrication. Second, if the chamber is to be operated at a high temperature, the chamber material should have a relatively high melting temperature. Third, the chamber material should be corrosion resistant, thus allowing the chamber to be used repeatedly. Fourth, the material should be hard enough to allow a good surface finish to be obtained. Fifth, the material should be relatively transparent to the magnetic fields generated by magnets 809 and 1019, thus insuring that the rotation of member 1015 results in the rotation of impeller 800. Sixth, the selected material must be strong enough to resist high pressures, even with relatively thin walls such as the chamber wall separating magnets 809 from cup member 1015. A variety of materials meet these criteria, including certain ceramics and metals. In one embodiment of the invention, chamber 1000 is fabricated from stainless steel.

Figure 11:
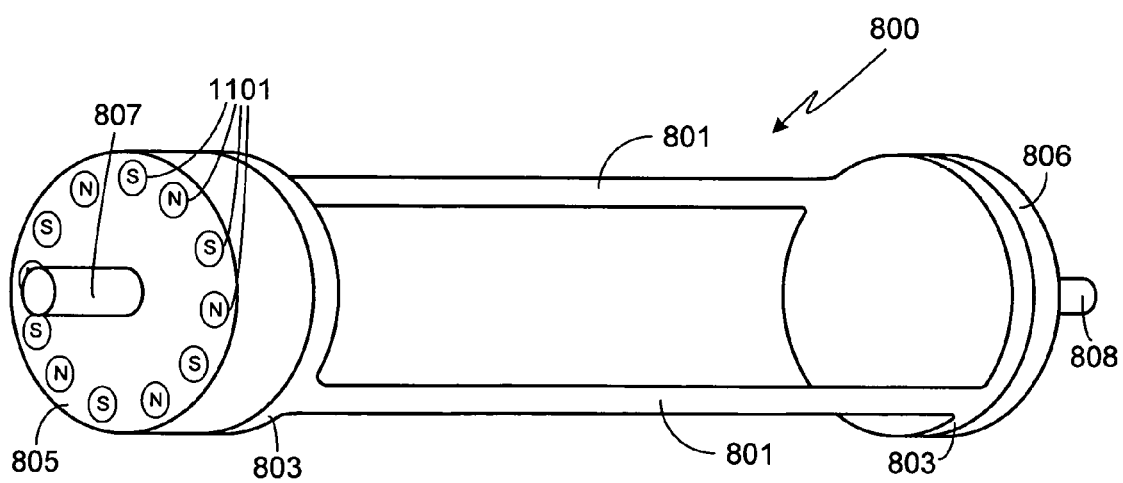
FIG. 11 is a perspective view of an alternate preferred impeller design for use with a cylindrical cavitation chamber.
Figure 12:
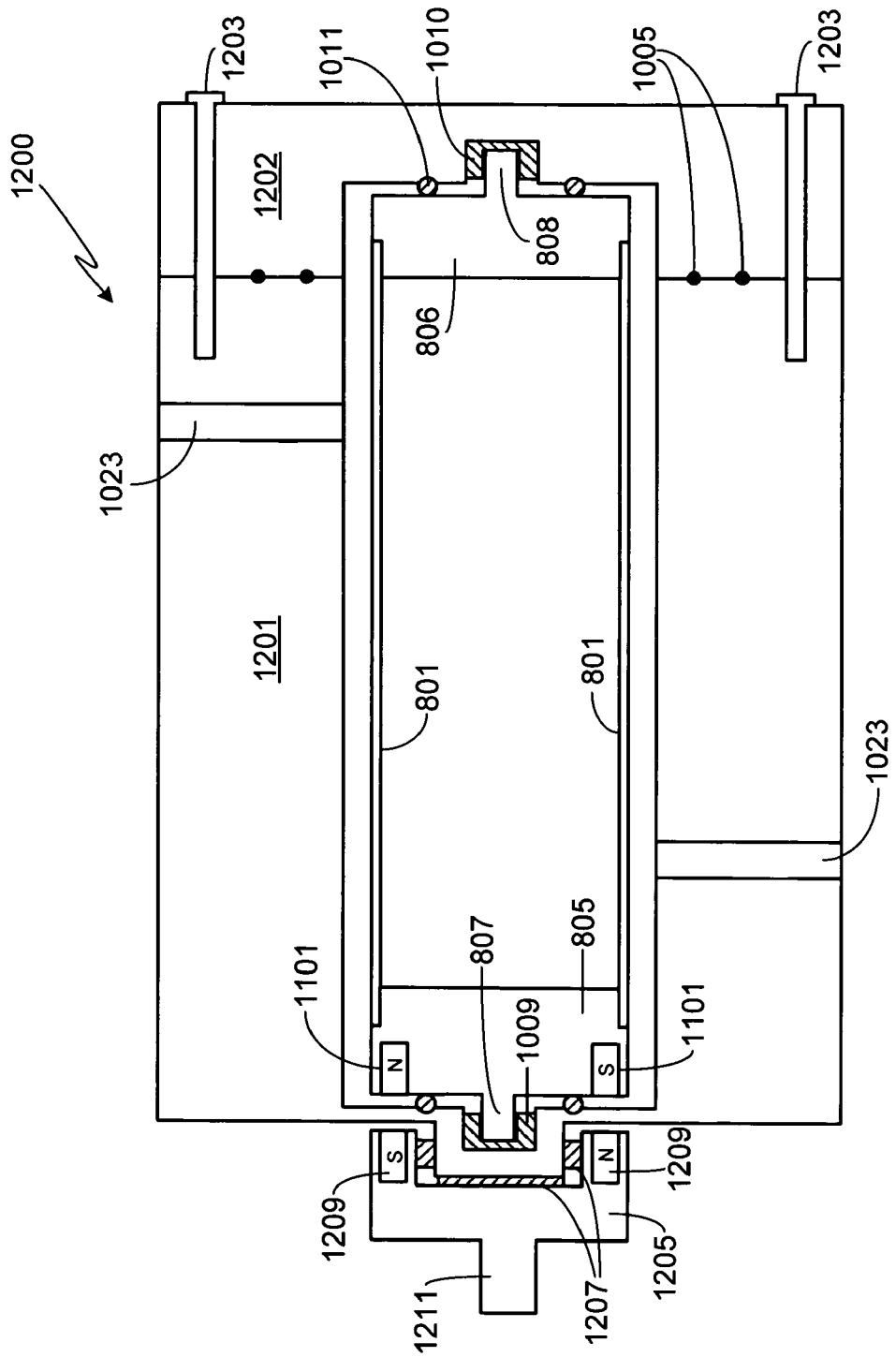
FIG. 12 is a cross-sectional view of a cavitation chamber utilizing the impeller shown in FIG. 11.

The embodiment shown in FIGS. 8-10 is only meant to illustrate one preferred implementation of the invention. It will be appreciated that there are many variations which can be used to magnetically couple a motor with the chamber's internal impeller. For example, FIGS. 11 and 12 illustrate an alternate embodiment in which permanent magnets 1101 are embedded in the end surface of end cap 805 as shown. As a consequence of the location of magnets 1101, the overall shape of chamber 1200 is different from that of the previous embodiment with chamber 1200 being comprised of sections 1201 and 1202. Although a variety of means can be used to couple the chamber sections together, as in the previous embodiment preferably the two sections are bolted together with a plurality of bolts 1203 and sealed with one or more sealing members 1005. Impeller 800 is held in place within chamber 1200, while still being free to rotate, using bearings and/or spacers 1009-1011.

As illustrated, the shape of the end portion of chamber section 1201 is such that the chamber wall adjacent to impeller magnets 1101 is thin enough to allow an external magnetic field to interact with the magnetic field produced by magnets 1101 while still being thick enough to handle peak pressures. A cup-shaped member 1205 is configured to rotate about the end portion of section 1201. Optionally one or more spacers 1207, for example Teflon spacers, are used to properly space and allow the rotation of member 1205. Embedded within member 1205 is a plurality of permanent magnets 1209 of alternating magnetic polarity, two such magnets being shown in the cross-sectional view of FIG. 12. A drive shaft 1211 provides a means of coupling member 1205 to a drive motor (not shown). Due to the magnetic field generated by magnets 1209 and its interaction with the magnetic field generated by magnets 1101, rotation of member 1205 causes the rotation of impeller 800 within chamber 1200.

Figure 13:
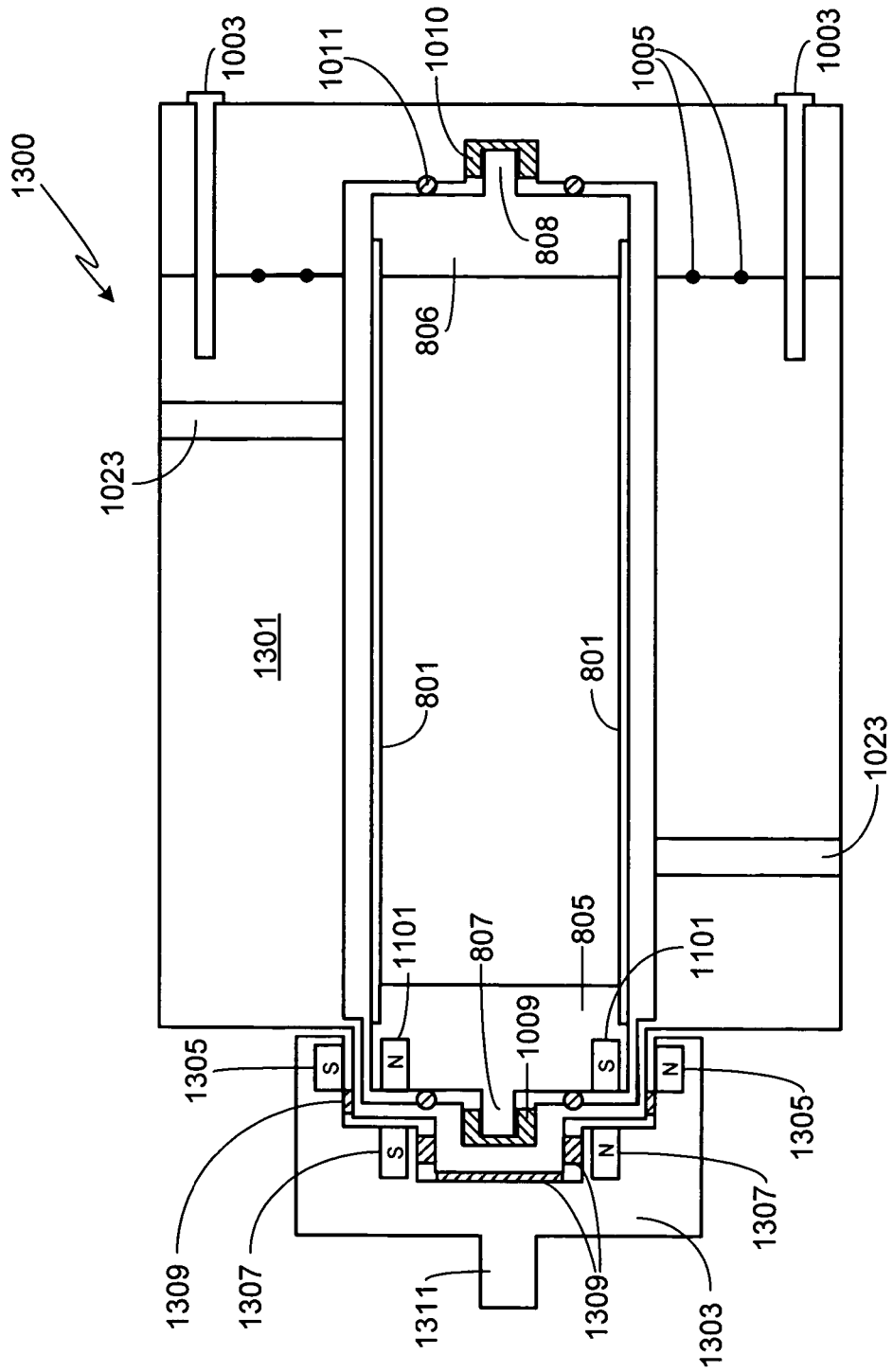
FIG. 13 is a cross-sectional view of an alternate cylindrical cavitation chamber utilizing a dual magnetic coupling system.

FIG. 13 is a cross-sectional view of an alternate embodiment configured to provide additional torque over the impeller. As shown, this embodiment combines magnetic coupling features of the previous two embodiments. In particular, chamber section 1301 is shaped to allow close proximity of cup-shaped member 1303 in two planes, thus allowing embedded magnets 1305 to interact with impeller magnets 1101 in one plane and embedded magnets 1307 in a second plane. As in the previous embodiments, a plurality of spacers 1309 insure proper spacing of member 1303 relative to chamber section 1301 while still permitting its free rotation. This embodiment allows a stronger magnetic field to be generated by magnetic coupler 1303 on impeller 800. A drive shaft 1311 allows member 1303 to be coupled to a drive motor (not shown).

It will be appreciated that the magnetic coupling systems illustrated in FIGS. 9-13 or those illustrated below can be duplicated on the opposite end of impeller 800, i.e., end cap 806, thereby easily doubling the strength of the drive mechanism by providing magnetic coupling and impeller rotation on either impeller end.

In addition to using any of a variety of magnetic coupling systems based on permanent magnets, it will be appreciated that the inventor also envisions countless variations utilizing electromagnetic coupling means. In such a system, impeller 800 includes a rotor at one end of the impeller assembly, or rotors at both ends of the impeller assembly, the rotor(s) including either permanent magnets or material susceptible to a magnetic field (e.g., a ferromagnetic material). An electromagnetic stator, external to the chamber and surrounding the rotor(s), provides the force required to turn the rotor(s) and thus the impeller assembly.

Figure 14:
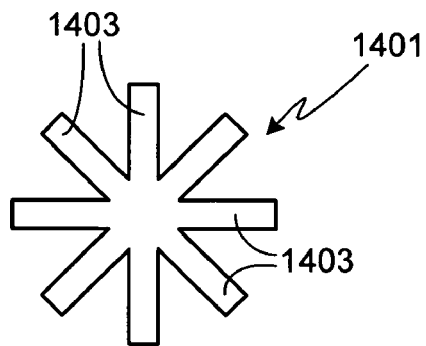
FIG. 14 is an end view of a ferromagnetic impeller rotor.
Figure 15:
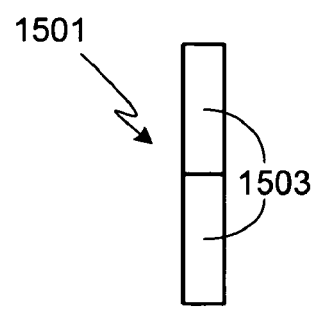
FIG. 15 is an end view of a permanent magnet impeller rotor.
Figure 16:
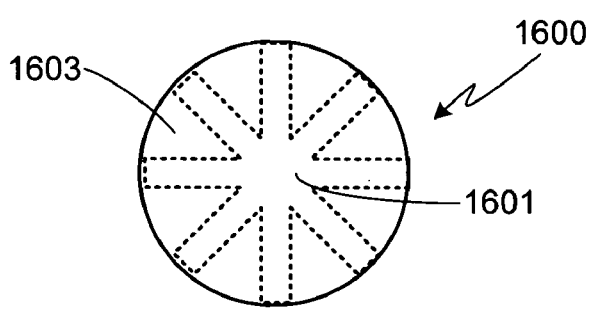
FIG. 16 is an end view of the impeller rotor of FIG. 14 embedded within a second material in order to eliminate rotor edges.
Figure 17:
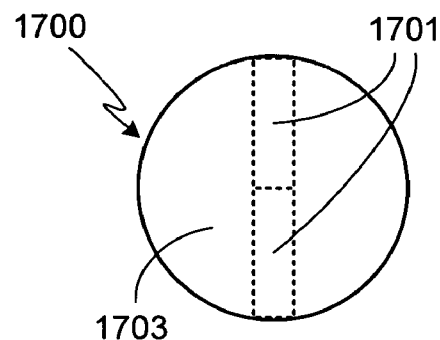
FIG. 17 is an end view of the impeller rotor of FIG. 15 embedded within a second material in order to eliminate rotor edges.
Figure 18:
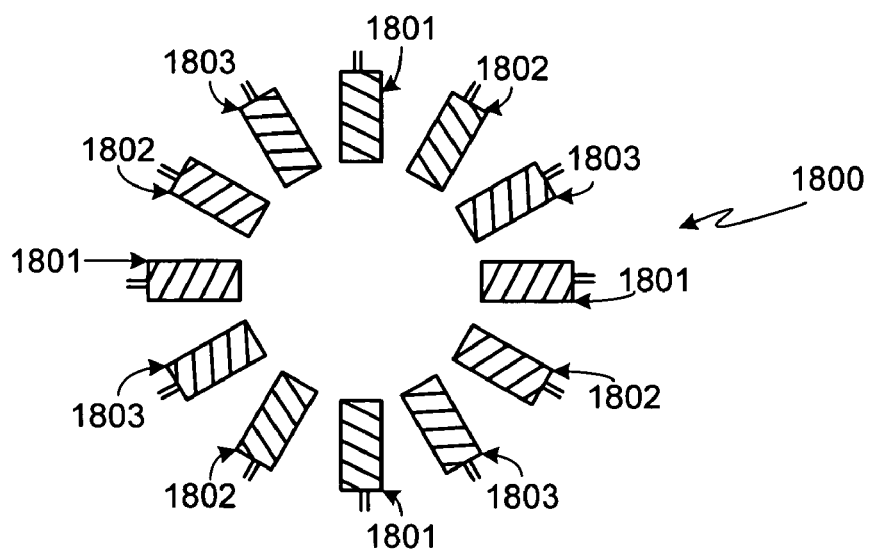
FIG. 18 is an end view of a stator.

FIGS. 14 and 15 provide end views of the rotors of exemplary impeller assemblies, rotor 1401 utilizing a ferromagnetic rotor and rotor 1501 utilizing a permanent magnet rotor. As shown, rotor 1401 includes 8 teeth 1403 while rotor 1501 includes 2 teeth 1503. It should be understood that the invention is not limited to specific rotor designs, rather rotors 1401 and 1501 are merely illustrative of the invention. In preferred embodiments of the invention, the rotors are embedded within a second material, thus eliminating the edges of the teeth. FIGS. 16 and 17 provide end views of two such embedded rotors. FIG. 16 shows a rotor assembly 1600 in which an 8 tooth ferromagnetic rotor 1601 (shown in phantom) is embedded within a non-ferromagnetic material 1603 (e.g., a ceramic). Similarly, FIG. 17 shows a rotor assembly 1700 in which a 2 tooth permanent magnet rotor 1701 (shown in phantom) is embedded within a non-ferromagnetic material 1703. By embedding the rotors within a cylindrically shaped second material, the rotor does not cause unwanted turbulence within the cavitation medium. Although the present invention is not limited to specific stator designs, an exemplary stator 1800 is shown in FIG. 18, stator 1800 having 12 stator poles divided into three stator pole sets 1801-1803.

Figure 19:
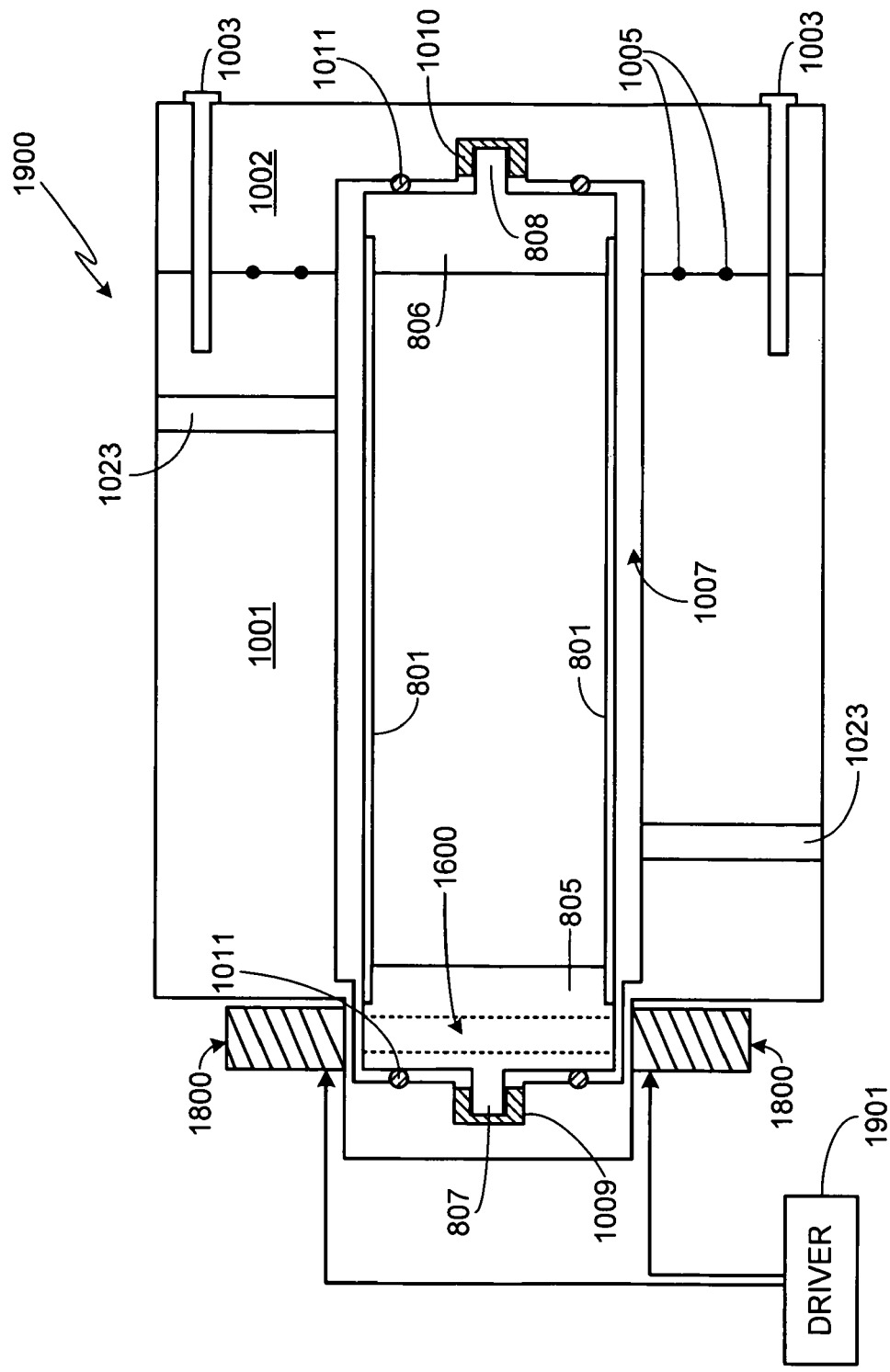
FIG. 19 is a cross-sectional view of another embodiment of the invention utilizing an electromagnetic coupling/drive system.

FIG. 19 is a cross-sectional view of a chamber 1900 which is similar to the configuration shown in FIG. 10. However impeller 800 of chamber 1900 is driven with an electromagnetic assembly in which a rotor 1600 (shown in phantom) is embedded within impeller end-cap 805. As shown, the electromagnetic assembly includes a stator 1800 coupled to a motor driver 1901. It will be appreciated that this is simply one possible configuration of the invention utilizing an electromagnetic system for driving impeller 800.

In addition to not being limited to a specific magnetic or electromagnetic coupling/driver, it should be appreciated that the present invention is not limited to a particular impeller design, chamber shape, cavitation system, etc. Thus, for example, the impeller assembly can use more than the two impeller blades shown in FIGS. 9 and 11. Alternately, a single cylindrical, spherical, or other shaped blade can be used such as described in co-pending U.S. patent application Ser. No. 11/038,344. It should also be appreciated that the invention does not require that the shape of the impeller assembly match that of the cavitation chamber. Thus, for example, a cylindrical impeller can be used with a spherical or rectangular chamber.

Figure 20:
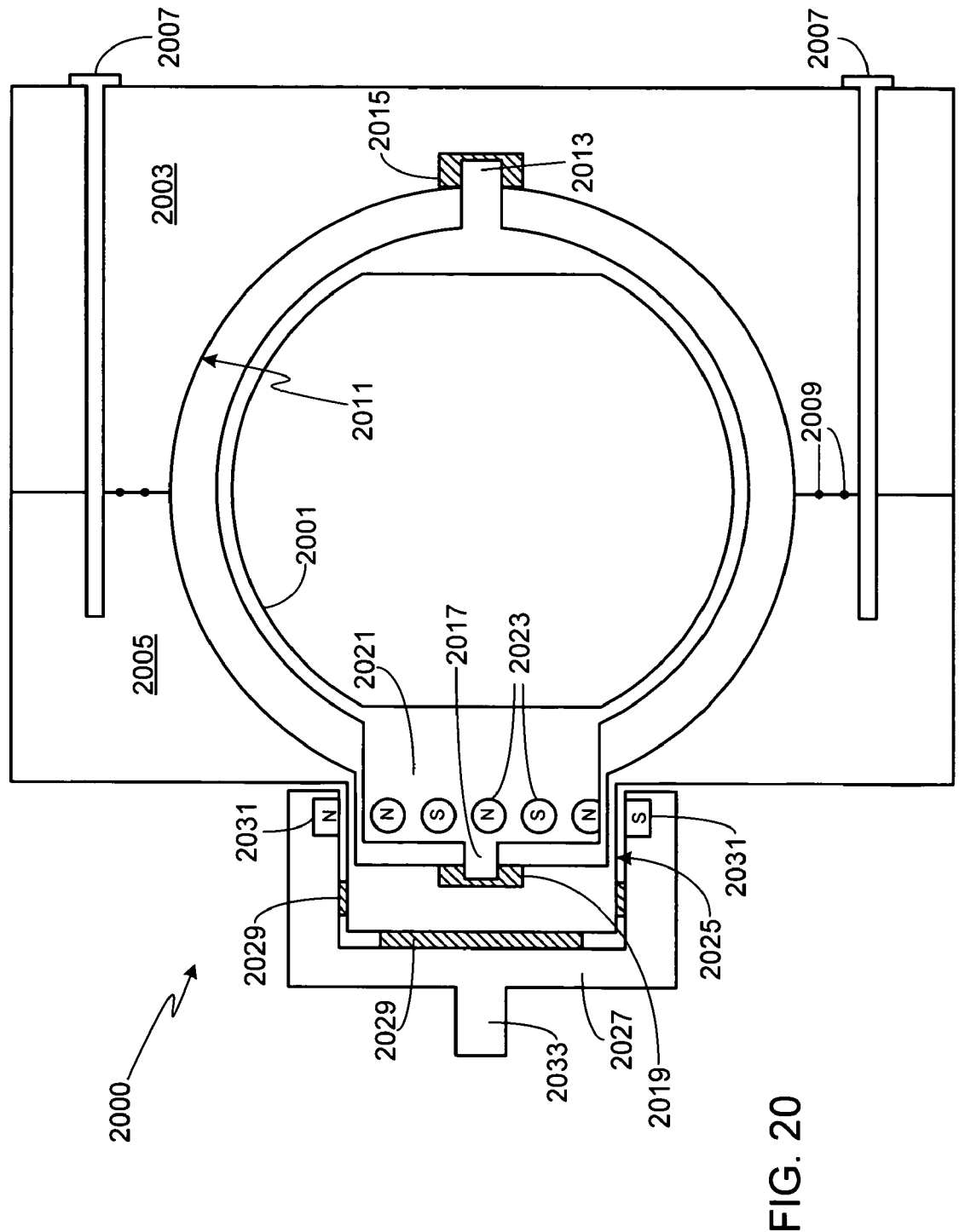
FIG. 20 is a cross-sectional view of another embodiment of the invention in which the cylindrical cavity of FIG. 10 is replaced with a spherical cavity.

FIG. 20 is a cross-sectional view of an embodiment of the invention used with a spherically-shaped impeller 2001 and a spherical cavitation chamber comprised of two sections 2003 and 2005. Although a variety of means can be used to join together and seal chamber sections 2003 and 2005, the preferred approach is with a plurality of bolts 2007 and one or more sealing members 2009 (e.g., o-ring, gasket, etc.). Prior to assembling portions 2003 and 2005, impeller 2001 is located within the spherical cavity 2011 such that spindle 2013 is fitted within bearing 2015 and spindle 2017 is fitted within bearing 2019. In one embodiment, bearings 2015 and 2019 are fabricated from a material with a low coefficient of friction, such as Teflon.

In the illustrated embodiment, embedded within cylindrically-shaped end portion 2021 of impeller 2001 is a plurality of permanent magnets 2023 of alternating magnetic polarity. The outer surface of end portion 2025 of chamber section 2005 is cylindrically shaped and is configured such that the chamber wall adjacent to the section of portion 2021 containing the embedded magnets 2023 is relatively thin. A cup-shaped member 2027 is configured to rotate about end portion 2025. Preferably one or more spacers 2029, for example Teflon spacers, are used to insure the smooth rotation of member 2027. Embedded within an internal surface of member 2027 adjacent to magnets 2023, is a plurality of permanent magnets 2031 of alternating magnetic polarity. A drive shaft 2033 of member 2027 is coupled to a drive motor (not shown). Due to the magnetic field generated by magnets 2031 and its interaction with the magnetic field generated by magnets 2023, rotation of member 2027 causes the rotation of impeller 2001 within chamber 2000. As previously noted, preferably the chamber includes a pair of chamber inlets (not shown), thus allowing the chamber to be filled, drained and/or coupled to a cavitation fluid circulatory system.

Impeller 2001 preferably includes at least 2 blades. As previously noted, if acoustic drivers are used with chamber 2000, impeller 2001 can utilize a solid (i.e., bladeless) impeller design, thus minimizing impeller induced turbulence. If a bladeless impeller is used, preferably it includes a plurality of holes near one or both spindle shaft ends, thus allowing fluid to flow between the inside and outside of the impeller.

It will be appreciated that any of the previously described magnetic coupling/drive systems can also be used with either a spherical chamber such as that shown in FIG. 20, or with other shaped cavitation chambers. Such magnetic coupling/drive systems can utilize permanent magnets, electromagnets or a combination of the two.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A method for manipulating cavitation bubbles within an enclosed cavitation chamber, comprising:
   filling a cavitation chamber with a liquid cavitation medium;

applying an acoustical driver to said cavitation chamber, causing acoustic cavitation within said chamber, and forming a plurality of cavitation bubbles within said liquid cavitation medium;

magnetically coupling an impeller disposed within said chamber to a rotator disposed outside said chamber;

rotating said rotator, causing a corresponding rotation of said magnetically coupled impeller; and stabilizing said plurality of cavitation bubbles within said liquid cavitation medium through rotation of said liquid cavitation medium about an axis of rotation of said impeller so as to position more than one of said plurality of bubbles substantially along said axis of rotation.

2. The method of claim 1, said rotating the rotor comprising rotating the rotor at a speed to prevent contact between said cavitation bubbles and an inner surface of said chamber.

3. The method of claim 1, further comprising confining said cavitation bubbles to an axial region substantially along said axis of rotation.

4. The method of claim 1, further comprising applying a rotational force to said liquid and said bubbles so as to elongate said bubbles in a direction substantially parallel to said axis of rotation.

5. The method of claim 1, further comprising driving said cavitation bubbles with acoustic energy to cause an energetic response by said bubbles to said acoustic energy.

* * * * *